United States Patent
Hong et al.

(10) Patent No.: US 11,626,241 B2
(45) Date of Patent: Apr. 11, 2023

(54) COIL ASSEMBLY

(71) Applicant: WITS Co., Ltd., Yongin-si (KR)

(72) Inventors: Ha Ryong Hong, Suwon-si (KR); Ki Won Chang, Suwon-si (KR); Geun Young Park, Suwon-si (KR)

(73) Assignee: WITS CO., LTD., Gyeonggi-do (KR)

( * ) Notice: Subject to any disclaimer, the term of this patent is extended or adjusted under 35 U.S.C. 154(b) by 1032 days.

(21) Appl. No.: 16/274,435

(22) Filed: Feb. 13, 2019

(65) Prior Publication Data
US 2020/0090858 A1 Mar. 19, 2020

(30) Foreign Application Priority Data
Sep. 19, 2018 (KR) .................. 10-2018-0112414

(51) Int. Cl.
| | |
|---|---|
| *H01F 27/28* | (2006.01) |
| *H01F 27/29* | (2006.01) |
| *H01F 41/04* | (2006.01) |
| *H01F 27/32* | (2006.01) |
| *H04B 5/00* | (2006.01) |
| *H01F 38/14* | (2006.01) |
| *H02J 7/02* | (2016.01) |

(52) U.S. Cl.
CPC ......... *H01F 27/2828* (2013.01); *H01F 27/29* (2013.01); *H01F 27/32* (2013.01); *H01F 38/14* (2013.01); *H01F 41/04* (2013.01); *H04B 5/0037* (2013.01); *H04B 5/0062* (2013.01); *H02J 7/025* (2013.01)

(58) Field of Classification Search
CPC ...... H01F 27/2828; H01F 27/29; H01F 27/32; H01F 38/14; H01F 41/04; H01F 27/323; H01F 27/28; H01F 27/2823; H01F 27/2871; H01F 27/306; H04B 5/0037; H04B 5/0062; H02J 7/025; H02J 7/0042; H02J 50/005; H02J 50/10
See application file for complete search history.

(56) References Cited

U.S. PATENT DOCUMENTS

| | | | |
|---|---|---|---|
| 2003/0001712 A1* | 1/2003 | Zou ...................... | H01F 41/041 336/200 |
| 2011/0102125 A1* | 5/2011 | Tamura .................. | H01F 27/34 336/232 |

(Continued)

FOREIGN PATENT DOCUMENTS

| | | | |
|---|---|---|---|
| CN | 107995786 A | * | 5/2018 |
| JP | 2015-149405 A | | 8/2015 |
| KR | 10-2014-0011955 A | | 1/2014 |

OTHER PUBLICATIONS

Merriam Webster, "Spiral Definition & Meaning," pp. 1-3 (Year: NA).*

(Continued)

*Primary Examiner* — Pinping Sun
(74) *Attorney, Agent, or Firm* — Harness, Dickey & Pierce, P.L.C.

(57) ABSTRACT

A coil assembly includes: a connection substrate including a coil pad and an accommodating portion disposed in a position adjacent to the coil pad; and a coil portion including a spiral wiring and an end portion bonded to the coil pad, wherein at least a portion of the coil portion is disposed in the accommodating portion.

21 Claims, 10 Drawing Sheets

(56) References Cited

U.S. PATENT DOCUMENTS

| | | | |
|---|---|---|---|
| 2012/0274148 A1* | 11/2012 | Sung | H02J 50/10 307/104 |
| 2013/0181668 A1* | 7/2013 | Tabata | H02J 50/70 320/108 |
| 2014/0197694 A1* | 7/2014 | Asanuma | H02J 50/402 307/104 |
| 2014/0247195 A1* | 9/2014 | Yen | H01L 23/66 343/873 |
| 2015/0145635 A1* | 5/2015 | Kurz | H04B 5/0037 336/232 |
| 2015/0207207 A1 | 7/2015 | Park et al. | |
| 2015/0222018 A1* | 8/2015 | Kumura | H02J 50/20 307/104 |
| 2016/0126009 A1* | 5/2016 | Chien | H02J 50/10 336/200 |
| 2016/0344223 A1* | 11/2016 | Lee | H02J 7/025 |
| 2017/0053741 A1* | 2/2017 | Stark | H01F 27/292 |
| 2018/0062350 A1* | 3/2018 | Sugiyama | H01S 5/141 |
| 2018/0130596 A1* | 5/2018 | Yamaguchi | H01F 27/2804 |
| 2019/0221359 A1* | 7/2019 | Hung | H01F 27/2804 |
| 2021/0005961 A1* | 1/2021 | Jang | H01Q 1/38 |

OTHER PUBLICATIONS

Lee, "Microelectronic Wire Bonding with Insulated Au Wire: Effects of Process Parameters on Insulation Removal and Crescent Bonding," Materials Transactions, vol. 49, No. 10 (2008) pp. 2347 to 2353 (Year: 2008).*

* cited by examiner

II-II'

COIL ASSEMBLY

CROSS-REFERENCE TO RELATED APPLICATIONS

This application claims the benefit under 35 USC 119(a) of Korean Patent Application No. 10-2018-0112414 filed on Sep. 19, 2018 in the Korean Intellectual Property Office, the entire disclosure of which is incorporated herein by reference for all purposes.

BACKGROUND

1. Field

The following description relates to a coil assembly.

2. Description of Related Art

Currently, many handheld terminals are provided with systems allowing wirelessly transmitted power to be received to charge a battery provided therein, or to perform additional functions, such as radio frequency identification (RFID), near field communications (NFC), and magnetic security transmissions (MST). Such functions are commonly performed by coils. Accordingly, a plurality of coils may be mounted in a handheld terminal.

There continues to be a demand for handheld terminals having a thin form factor. As such, a coil assembly including a plurality of coils may be mounted in such thin handheld terminals. Therefore, it is desirable to provide a coil structure that provides a high degree of wireless power transmission efficiency while minimizing the size of the coil assembly.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a coil assembly includes: a connection substrate including a coil pad and an accommodating portion disposed in a position adjacent to the coil pad; and a coil portion including a spiral wiring and an end portion bonded to the coil pad, wherein at least a portion of the coil portion is disposed in the accommodating portion.

The end portion may include a first section bonded to the coil pad, and a second section extended from the first section and at least partially disposed in the accommodating portion.

The first section may have a thickness that is less than a thickness of the second section.

The accommodating portion may be disposed on opposing sides of the coil pad.

The accommodating portion may be a through-hole passing through the connection substrate.

The connection substrate may further include a connection pad and a connection wiring connecting the connection pad to the coil pad.

The coil portion may further include an insertion groove disposed in a position opposing the connection wiring. At least a portion of the connection wiring may be disposed in the insertion groove.

The coil portion may further include coil strands disposed in parallel and spirally wound. The coil strands may be electrically connected to each other in the end portion.

Each of the coil strands may include a conductor line, an insulating coating surrounding the conductor line, and an adhesive layer disposed outside the insulating coating. The coil strands may be integrated by the adhesive layer.

The coil portion may further include a step formed along a pressure line formed in a radial direction of the coil portion.

The coil strands may be disposed on a same plane.

The coil assembly may further include: a supporting substrate to which the coil portion is attached, wherein the supporting substrate includes a substrate combining portion to which the connection substrate is bonded.

The end portion and another end portion of the coil portion may be disposed on the substrate combining portion.

The coil pad may include a first coil pad disposed at a center of the coil portion and a second coil pad disposed outside the coil portion.

The coil portion may be configured to perform any one of transmission and reception of electric power for wireless charging, a radio frequency identification (RFID) function, a near field communication (NFC) function, and a magnetic security transmission (MST) function.

In another general aspect, a coil assembly includes: a connection substrate including a coil pad; and a coil portion including coil strands disposed in parallel and formed in a spiral shape in a single layer, an end portion bonded to the coil pad, and at least one stepped portion formed by a pressure line formed in a radial direction of the coil portion.

In another general aspect, a coil assembly includes: a connection substrate including a coil pad and a connection wiring extended from the coil pad; and a coil portion including coil strands disposed in parallel to form a spiral shape, an end portion bonded to the coil pad, and an insertion groove disposed in a position opposing the connection wiring, wherein at least a portion of the connection wiring is disposed in the insertion groove.

The insertion groove may be formed in the coil strands and extend in a radial direction of the coil portion.

A thickness of the insertion groove may be substantially equal to a thickness of the connection wiring.

In another general aspect, a coil assembly includes: a flat spiral-shaped coil member composed of coil strands, and including an insertion groove extending across the coil member; and a connection substrate including a connection pad configured to be connected to an external component, a first coil pad disposed at a center side of the coil member and connected to a first end portion of the coil member, a second coil pad disposed at an outer side of the coil member and connected to a second end portion of the coil member, a first connection wiring connecting the first coil pad to the connection pad, and disposed in the insertion groove, and a second connection wiring connecting the second coil pad to the connection pad.

A thickness of the insertion groove may be substantially equal to a thickness of the first connection wiring.

The insertion groove may be formed by a portion of the coil strands having a reduced thickness.

A thickness of the coil member in a region of the insertion groove may be less than a thickness of the coil member a region adjacent to the insertion groove.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
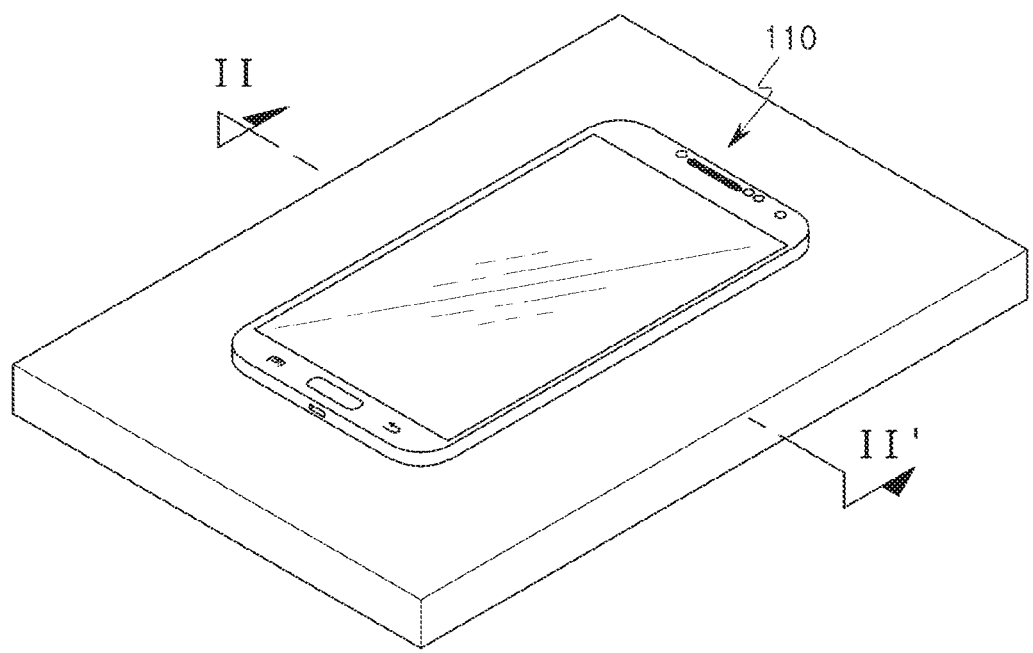
FIG. 1 is a schematic perspective view illustrating an electronic device, according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
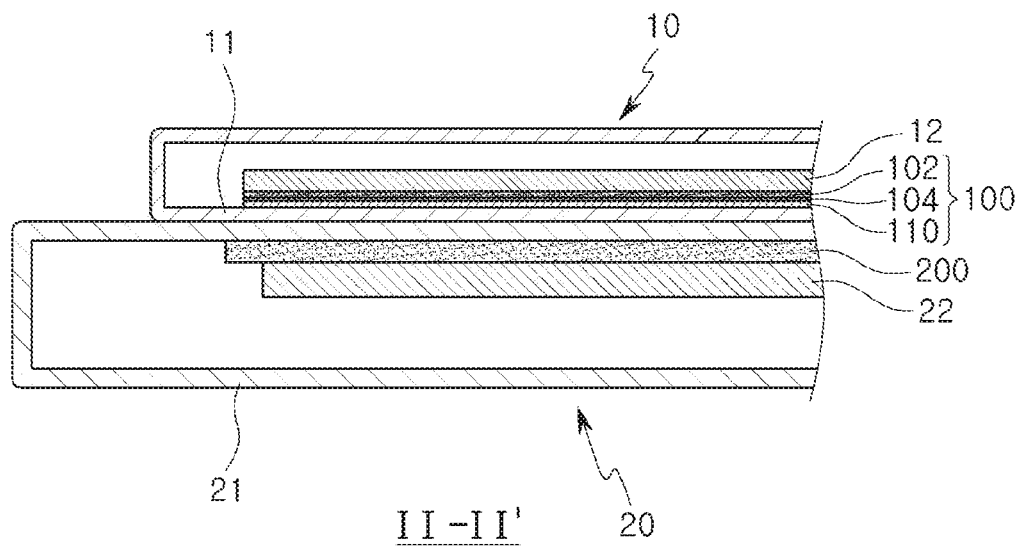
FIG. 2 is a cross-sectional view taken along line II-II' of FIG. 1.

FIG. 1 is a schematic perspective view illustrating an electronic device, according to an example. FIG. 2 is a cross-sectional view taken along line Ill l' of FIG. 1. Referring to FIGS. 1 and 2, an electronic device, according to an embodiment, may be a wireless charger 20 configued to wirelessly transmit power, or may be a handheld terminal 10 configured to wirelessly receive and store power.

The handheld terminal 10 may include a battery 12 and a power receiver 100 configured to supply power to the battery 12 to charge the battery 12.

The battery 12 may be a secondary battery that may be charged or discharged, and may be attached to or detached from the handheld terminal 10. However, the battery 12 is not limited to such an example.

The power receiver 100 may be disposed inside a case 11 of the handheld terminal 10 to be directly attached to an inner surface of the case 11 or to be close to, or minimally spaced from, the inner surface of the case 11.

The power receiver 100 may include a magnetic portion 102 and a coil assembly 110.

The magnetic portion 102 may have a flat plate shape (or a sheet shape), and may be disposed on a surface of the coil assembly 110 to be fixedly attached to the coil assembly 110. The magnetic portion 102 may form a magnetic path for a magnetic field generated by a coil wiring of the coil assembly 110. To this end, the magnetic portion 102 may include a material allowing a magnetic path to be easily formed. For example, the magnetic portion 102 may include a ferrite sheet.

Although not illustrated, an additional metal sheet configured to block electromagnetic waves or magnetic flux leakage may be further included between the magnetic portion 102 and a battery 12, if necessary. The metal sheet may be formed of aluminum (Al), or another suitable material. However, the disclosure is not limited to the described configuration of the additional metal sheet.

The power receiver 100 may include an adhesive portion 104 interposed between the coil assembly 110 and the magnetic portion 102 so that the coil assembly 110 and the magnetic portion 102 are fixedly bonded to each other.

The adhesive portion 104 may be disposed in a space between the coil assembly 110 and the magnetic portion 102, and may bond the magnetic portion 102 to the coil assembly 110. The adhesive portion 104 may be formed as an adhesive sheet or an adhesive tape, and may also be formed by applying an adhesive or a resin having adhesive properties onto a surface of the coil assembly 110 or the magnetic portion 102.

The adhesive portion 104 may include a ferrite powder, and may thus also have magnetic properties together with the magnetic portion 102.

The charger 20 may charge the battery 12 of the handheld terminal 10. For this purpose, the charger 20 may include a voltage converter 22 and a power transmitter 200 disposed inside a case 21.

The voltage converting unit 22 may convert commercially available alternating current (AC) power, supplied from an external power source, into direct current (DC) power. The voltage converting unit 22 may convert the converted DC power to an AC voltage having a certain frequency, and may provide the converted AC voltage to the power transmitter 200.

When the abovementioned AC voltage is applied to the power transmitter 200, a level of a magnetic field around the power transmitter 200 may be changed. Accordingly, a voltage may be applied to the power receiver 100 of the mobile terminal 10 when the mobile terminal 10 is disposed adjacent to the power transmitter 200, depending on changes in the magnetic field, and the battery 12 may thus be charged by the voltage applied to the power receiver 100.

The power transmitter 200 may include a magnetic portion and a coil assembly, in a manner the same as or similar to the power receiver 100 described above. Thus, a detailed description of the power transmitter 200 will be omitted hereinafter.

A coil assembly disposed in the power receiver 100 or the power transmitter 200 will hereinafter be described in more detail.

Figure 3:
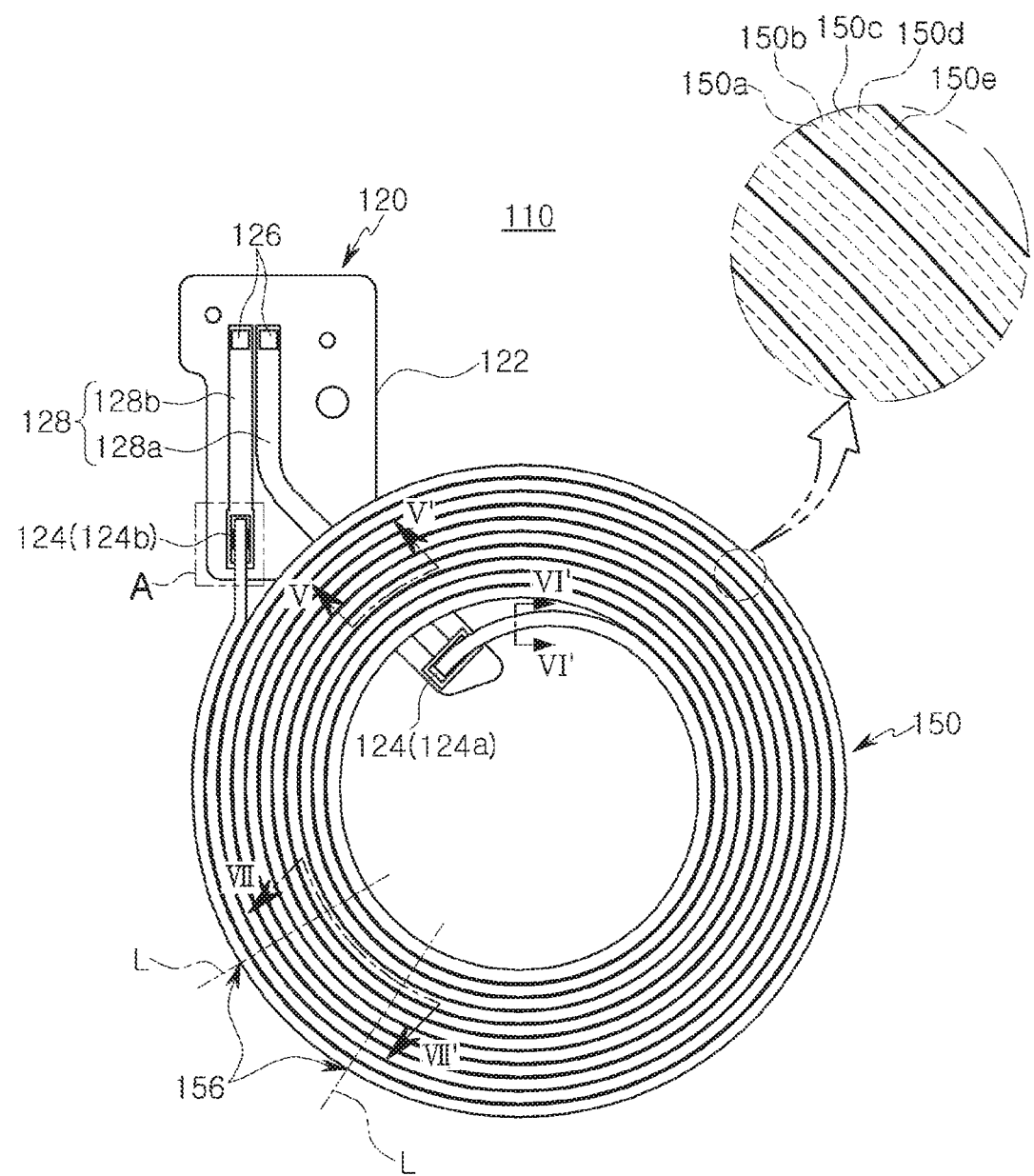
FIG. 3 is a schematic plan view illustrating a coil assembly of the example of FIG. 2.
Figure 4:
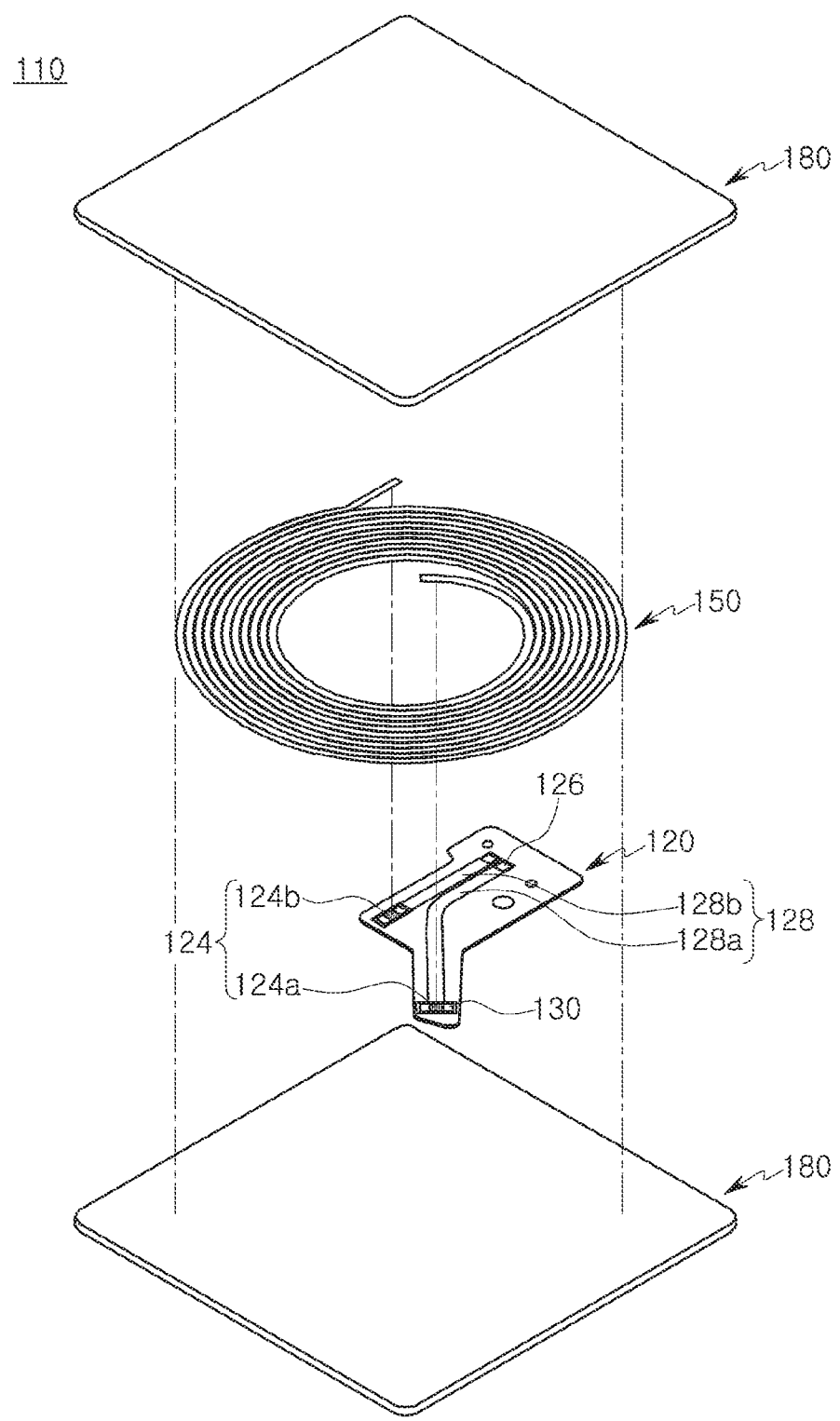
FIG. 4 is an exploded perspective view of the coil assembly illustrated in FIG. 3.
Figure 5:
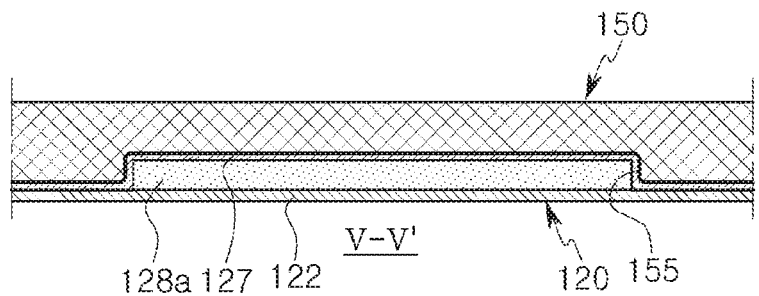
FIG. 5 is a cross-sectional view taken along line V-V' of FIG. 3.
Figure 6:
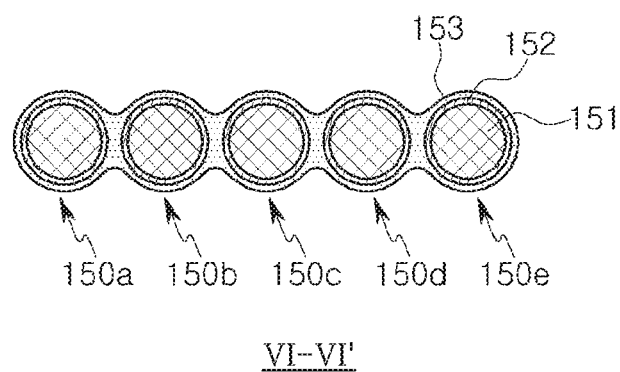
FIG. 6 is a cross-sectional view taken along line VI-VI' of FIG. 3.
Figure 7:
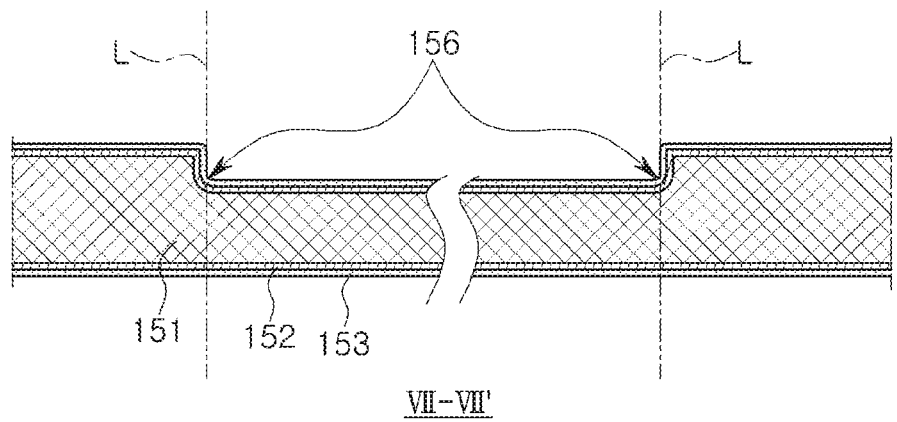
FIG. 7 is a cross-sectional view taken along line VII-VII' of FIG. 3.

FIG. 3 is a schematic plan view illustrating a coil assembly 110, according to the example of FIG. 2. FIG. 4 is an exploded perspective view of the coil 110. Moreover, FIG. 5 is a cross-sectional view taken along line V-V' of FIG. 3. FIG. 6 is a cross-sectional view taken along line VI-VI' of FIG. 3. FIG. 7 is a cross-sectional view taken along line VII-VII' of FIG. 3. For convenience of explanation, a protective member 180 is only illustrated in FIG. 4.

Referring to FIGS. 3 to 7, the coil assembly 110 includes a coil portion or coil member 150 and a connection substrate 120.

The coil portion 150 is a spiral wiring having a spiral shape and having a plurality of turns, and includes coil strands 150a to 150e, provided with an insulating coating 152. In an example, the coil strands 150a to 150e are disposed generally parallel to each other and wound in a spiral shape which is concentric, and are arranged closely together.

Respective coil strands 150a to 150e are electrically connected to each other in an end portion of the coil portion 150. Thus, respective coil strands 150a to 150e are connected to each other in parallel.

As illustrated in FIG. 6, each of the coil strands 150a to 150e includes a conductor line 151, the insulating coating 152 surrounding the conductor line 151, and an adhesive layer 153 disposed outside the insulating coating 152.

The conductor line 151 may be a copper wire, but is not limited to being a copper wire.

The insulating coating 152 may be formed of an insulating material such as polyurethane, polyimide, or polyesterimide. Moreover, the adhesive layer 153 may be polyamide. However, the insulating coating 152 is not limited to such materials.

The adhesive layer 153 is disposed on a surface of the insulating coating 152, and may bond the coil strands 150a to 150e to be disposed in contact with each other. Thus, due to the adhesive layer 153, the coil strands 150a to 150e are integrated, and are therefore configured as a single member.

As illustrated in FIG. 6, in an example, in the coil strands 150a to 150e, a cross section of the conductor line 151 is provided to have a circular shape, but is not limited to a circular shape. Alternatively, the coil strands 150a to 150e may be configured to include a flat type conductor line or an edge-wise conductor line. Moreover, in an example, it is illustrated that five coil strands 150a to 150e form the coil portion 150, by way of example, but the coil portion 150 may have greater than or less than five coil strands.

The coil portion 150 may be manufactured by applying heat to the coil strands 150a to 150e while spirally winding the coil strands. Thus, one adhesive layer portion (i.e., a portion of the adhesive layer 153) disposed on one of the coil strands 150a to 150e is melted and cured with an adjacent adhesive layer portion disposed on an adjacent coil strand among the coil strands 150a to 150e that is in contact with the one adhesive layer portion, such that the one adhesive layer portion and the adjacent adhesive layer portion are bonded to each other to form the adhesive layer 153. Therefore, the adhesive layer 153 is disposed to surround the entirety of the coil strands 150a to 150e.

Moreover, the coil portion 150 may be configured to have a form similar to that of a Litz wire, and may be formed to be thin and flat.

To reduce a thickness of the coil assembly 110, the coil portion 150 may have a spiral shape formed in a single layer. Thus, respective coil strands 150a to 150e are disposed on the same plane.

In a configuration in which the coil strands 150a to 150e form a single layer, a thickness of the coil portion 150 is small, so the coil portion may be easily partially bent or curved. Thus, it is difficult to maintain the entirety of the coil portion 150 to be flat. To this end, the coil portion 150 may include at least one stepped portion 156, as shown in FIGS. 3 and 7. The stepped portion 156 may be a region of the coil portion in which the coil strands 150a to 150e have a thickness different from a thickness of other/adjacent regions of the coil strands 150a to 150e based on a pressure line L formed in a radial direction (or a radiation direction) of the coil portion 150.

The stepped portion 156 may be formed by applying pressure on one surface of the coil portion 150 using a separate jig or a pressing device. During the process described above, the coil portion 150 is partially deformed and thus a step is formed. Thus, bending or curvature resistance of the coil strands 150a to 150e may be improved.

In an example, the stepped portion 156 is partially formed in a portion in which the stepped portion 156 is necessary. For example, the stepped portion 156 may be selectively formed in a portion in which bending or curvature is significant. Thus, the coil portion 150 may include a single stepped portion 156 or a plurality of stepped portions 156, if necessary.

Referring to FIG. 5, the coil portion 150 may also include an insertion groove 155. A portion or the entirety of a first connection wiring 128a of the connection substrate 120 described above may be inserted into the insertion groove 155. Thus, the insertion groove 155 may be formed in a region opposing the first connection wiring 128a, and may be provided as a groove in the form in which a thickness of the coil portion 150 is less than a thickness of other/adjacent regions of the coil portion 150.

The insertion groove 155 may be formed to have a thickness the same as or similar to a thickness of the first connection wiring 128a.

The first connection wiring 128a is disposed to intersect the coil portion 150 in a radial direction, and the insertion groove 155 is formed in a turn forming a spiral of the coil portion 150.

If the insertion groove 155 were not provided, a coil assembly would be formed to have a thickness increased by an amount equal to a thickness of the first connection wiring 128a. However, in an example, when the insertion groove 155 is provided, the first connection wiring 128a is inserted into the insertion groove 155, so that a thickness of the coil portion 150/coil assembly 110 is reduced by a thickness of the first connection wiring 128a. Thus, a thickness of the coil assembly 110 is significantly reduced in comparison to a coil assembly that does not include the insertion groove 155.

The coil portion 150 may be used for transmission and reception of electric power for wireless charging. However, the coil portion 150 is not limited to transmission and reception of electric power for wireless charging, and the coil portion 150 may perform at least one of a radio frequency identification (RFID) function, a near field communication (NFC) function, and a magnetic security transmission (MST) function.

The connection substrate 120 may be a film or a flexible substrate such as a flexible PCB. The flexible substrate may be a circuit board in which a circuit pattern is formed using a copper foil above an insulating film 122 (FIG. 5), for example, polyimide, having a relatively small thickness (for example, 10 μm). However, the connection substrate 120 is not limited to such a configuration, and various materials may be used as long as a thickness is reduced, flexible properties are provided, and a circuit pattern is formed.

Although the connection substrate 120 is described above as having flexible properties, a printed circuit board (PCB) having rigidity may be used for the connection substrate 120, as required.

As shown in FIG. 5, a protective layer 127 having insulating properties may be formed on an upper portion of a circuit pattern. As shown in FIGS. 3 and 4, pads 124 and 126 may be exposed outwardly of the protective layer 127.

Still referring to FIGS. 3 and 4, according to an example, the pad 124 is a coil pad to which the coil portion 150 is connected, and the pad 126 is connection pad electrically connected an external member such as a battery or a circuit board of a portable device. The connection substrate 120 has a connection wiring 128 connecting the coil pad 124 to the connection pad 126.

The connection substrate 120 is provided to lead out both ends of the coil portion 150 outwardly of the coil portion 150.

As shown in FIGS. 3 and 4, the coil pad 124 includes a first coil pad 124a disposed at the center of the coil portion 150, and a second coil pad 124b disposed outside the coil portion 150. The first coil pad 124a is connected to an end portion of the coil portion 150 disposed at a center side of the coil portion 150. The second coil pad 124b is connected to an end portion disposed at an outer side of the coil portion 150.

Still referring to FIGS. 3 and 4, the connection wiring 128 includes a first connection wiring 128a connecting the first coil pad 124a to the connection pad 126, and a second connection wiring 128b connecting the second coil pad 124b to the connection pad 126.

The first coil pad 124a is disposed at the center of the coil portion 150, so that the first connection wiring 128a is disposed to intersect a spiral shape of the coil portion 150 in a radial direction. Additionally, the entirety of the second connection wiring 128b is disposed outside the coil portion 150.

To significantly reduce a thickness of the coil assembly 110, the first connection wiring 128a may be disposed in the insertion groove 155 formed in the coil portion 150. That is, the first connection wiring 128a being disposed in the insertion groove 155 prevents an increase in an overall thickness of the coil assembly 110 due to the overlap of the first connection wiring 128a and the coil portion 150.

The connection wiring 128 is formed as a circuit pattern such as a copper foil, and thus may be formed to have a thickness less than that of the coil portion 150. Thus, if a width of the connection wiring 128 is insufficient, loss occurring in the connection wiring 128 may be increased. In this regard, the connection wiring 128 may be formed to have a line width greater than a width of a turn formed by the coil strands 150a to 150e. The disclosure is not, however, limited to such a configuration.

Additionally, as shown in FIG. 4, the connection substrate 120 may include an accommodating portion 130 around the coil pad 124.

Figure 8:
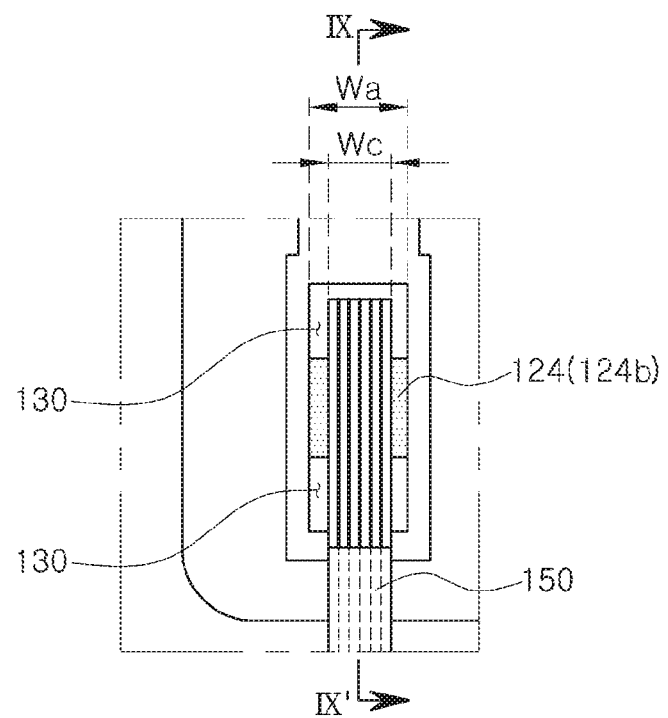
FIG. 8 is an enlarged view of portion A illustrated in FIG. 3.
Figure 9:
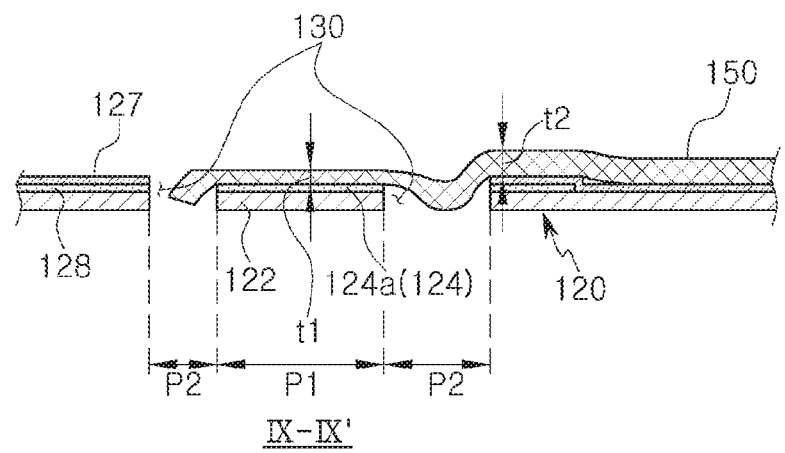
FIG. 9 is a cross-sectional view taken along line IX-IX' of FIG. 8.

FIG. 8 is an enlarged view of portion A illustrated in FIG. 3. FIG. 9 is a cross-sectional view taken along line IX-IX' of FIG. 8.

Referring to FIGS. 8 and 9, the accommodating portion 130 is formed to have a space in which an end portion of the coil portion 150 is partially accommodated. Thus, a width Wa of the accommodating portion 130 is greater than a width We of an end portion of the coil portion 150.

In an example, an end portion of the coil portion 150 is a section disposed to oppose the coil pad 124 and the accommodating portion 130. Referring to FIG. 9, in an example, an end portion of the coil portion 150 is pressed using a welding tip (T of FIG. 11) to be thermally fused, and thus a portion (P1, hereinafter, referred to as a first section) of the end portion is bonded to the coil pad 124 by thermal fusing. Thus, a thickness t1 of the first section P1, bonded to the coil pad 124, is formed to be less than a thickness t2 of a section (P2, referred to as a second section) extended from the first section P1.

Additionally, while an end portion of the coil portion 150 is pressed, at least a portion of the second section P2 described above is disposed in the accommodating portion 130.

If the first section P1 of the coil portion 150 were only pressed using the welding tip T, a thickness of the first section P1 would be reduced by pressure of the welding tip. However, due to a repulsive force in response to the pressing, the second section P2, located outside the welding tip, would be lifted upwardly. In such a case, the second section P2 would be spaced apart from the connection substrate 120, so an overall thickness of the coil assembly would be increased.

To solve the problem described above, in the coil assembly 110, the second section P2 is pressed together in a thermal fusing process, and the second section P2 is therefore enabled to be placed in the accommodating portion 130. A method for disposing the second section P2 in the accommodating portion 130 will be described in a manufacturing method below.

Figure 10:
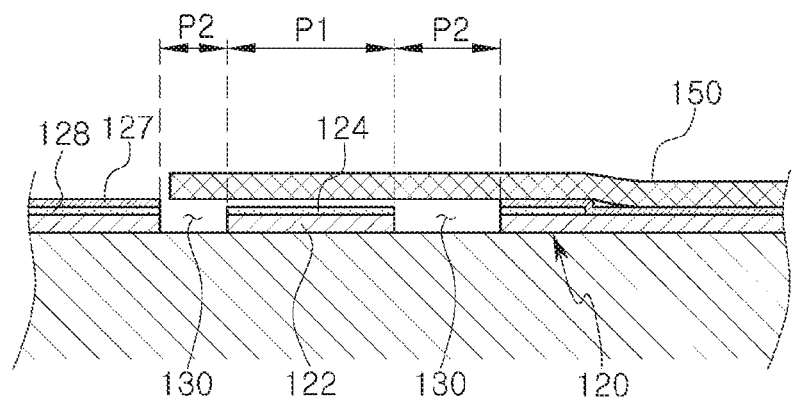
FIGS. 10 and 11 are cross-sectional views illustrating a method for manufacturing the coil assembly illustrated in FIG. 3, according to an example.
Figure 11:
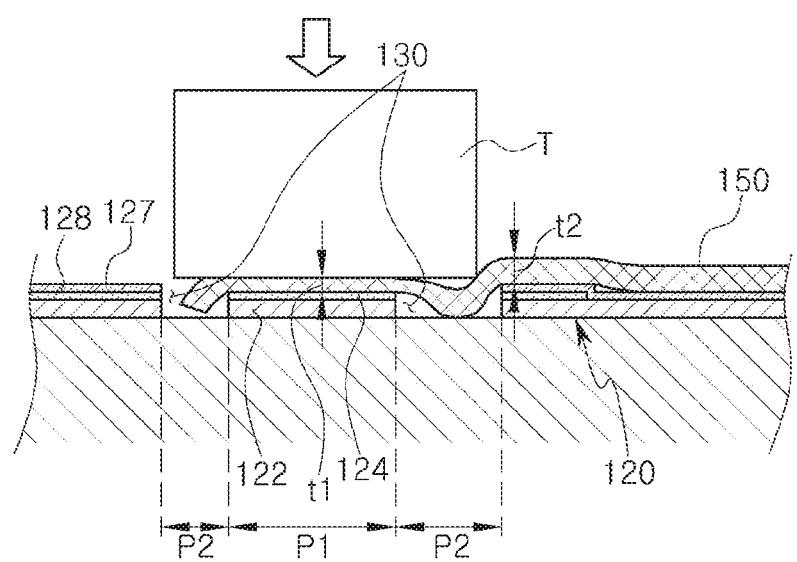

FIGS. 10 and 11 are cross-sectional views illustrating a method for manufacturing the coil assembly 110, and illustrate a cross section taken long line IX-IX' of FIG. 8.

First, as illustrated in FIG. 10, an end portion of the coil portion 150 is disposed on the coil pad 124 of the connection substrate 120. A conductive adhesive such as a solder (for example, lead-free solder) is applied, in advance, on a surface of the coil pad 124 or the end portion of the coil portion 150.

Then, as illustrated in FIG. 11, the first section P1 of the coil portion 150 is pressed and heated using the welding tip T. Thus, while the conductive adhesive, which has been applied on the coil pad 124 or the first section P1 in advance, is melted and cured, the first section P1 of the coil portion 150 and the coil pad 124 are bonded to each other. The first section P1 of the coil portion 150 and the coil pad 124 may be bonded using a hetero-junction or thermal fusion welding method.

In an example, the welding tip T is formed to have a size capable of pressing not only the first section P1 but also the second section P2. For example, the welding tip T may be formed to have a size covering the entirety of the coil pad 124 and a portion of the accommodating portion 130. Thus, in the pressing and heating process described above, the welding tip T may partially press the second section P2, which is disposed on the accommodating portion 130, together with the first section P1. Thus, the second section P2, which is pressed by the welding tip T, is accommodated in the accommodating portion 130.

In the state described above, the conductive adhesive is completely cured. Thus, even when the welding tip is removed, the second section P2 remains located in the accommodating portion 130.

Through the method described above, the second section P2 of the coil portion 150 is disposed in the accommodating portion 130, so the entirety of an end portion of the coil portion 150 is disposed as closely as possible to the connection substrate 120. Thus, an overall thickness of the coil assembly 110 is prevented from being increased by lifting of a portion of the coil portion 150.

In the described example, the accommodating portion 130 is disposed on each of both sides of the coil pad 124. Thus, the second section P2, which is disposed on both sides of the first section P1, is disposed in the accommodating portion 130. However, is the accommodating portion 130 and the coil pad 124 are not limited to this configuration, and various modifications are possible. For example, a single accommodating portion 130 may be disposed only in one side of the coil pad 124, if necessary.

Additionally, in an example, the accommodating portion 130 is provided in the form of a through-hole. However, the accommodating portion 130 is not limited to being in the form of a through-hole, and may be configured in the form of a groove, if necessary.

Additionally, since the accommodating portion 130 is formed between the connection wiring 128 and the coil pad 124, the accommodating portion 130 is disposed to pass through not only the insulating film 122 but also through the connection wiring 128. Thus, to connect the coil pad 124 to the connection wiring 128, a line width of the connection wiring 128 may be extended in a portion of the connection wiring 128 in which the accommodating portion 130 is disposed. That is, a line width of the connection wiring 128 may be greater in the portion of the connection wiring 128 in which the accommodating portion 130 is disposed than a line width of the connection wiring 128 in portions of the connection wiring 128 in which the accommodating portion 130 is not disposed. However, the accommodating portion 130 and the connection wiring 128 are not limited to such a configuration, and the accommodating portion 130 may be configured to only pass through the insulating film 122.

Also, as illustrated in FIG. 4, the coil assembly 110 may include a protective member 180. The protective member 180 may protect the coil portion 150 from an external environment while covering the coil portion 150 and the connection substrate 120.

FIG. 4 illustrates a case in which two protective members 180 are provided, but only a single protective member 180 may be provided, as necessary. When two protective members 180 are provided, the coil portion 150 and the connection substrate 120 may be disposed between two protective members 180.

The protective member 180 may be various members as long as a member with electrical insulation properties is able to be easily combined with the coil portion 150 or the connection substrate 120, such as the insulating film 122 or an insulating tape.

Since the connection pad 126 is a region that is in contact with an external component, at least a portion of the connection pad 126 is exposed outwardly of the protective member 180. Thus, the protective member 180 is not disposed on the connection pad 126.

The power receiving device 100 has a coil portion 150 in which the plurality of coil strands 150a to 150e form a single layer, and may lead out both ends of the coil portion 150 outwardly using the connection substrate 120 provided as a circuit board.

Since an end portion of the coil portion 150 is disposed in the accommodating portion 130 of the connection substrate 120, a thickness of the coil assembly 110 is prevented from being increased by lifting a portion of the coil portion 150. In addition, the connection wiring 128 of the connection substrate 120 is inserted into the insertion groove 155 formed in the coil portion 150. Thus, a thickness of the coil assembly 110 is significantly reduced, so the coil assembly 110 may be easily mounted on a mobile terminal having a thin form factor.

The configuration of the coil assembly 110 described above may be applied to a power transmitter 200 provided in a charger 20. Thus, a detailed description of the coil assembly 110 included in the power transmitter 200 will be omitted.

Figure 12:
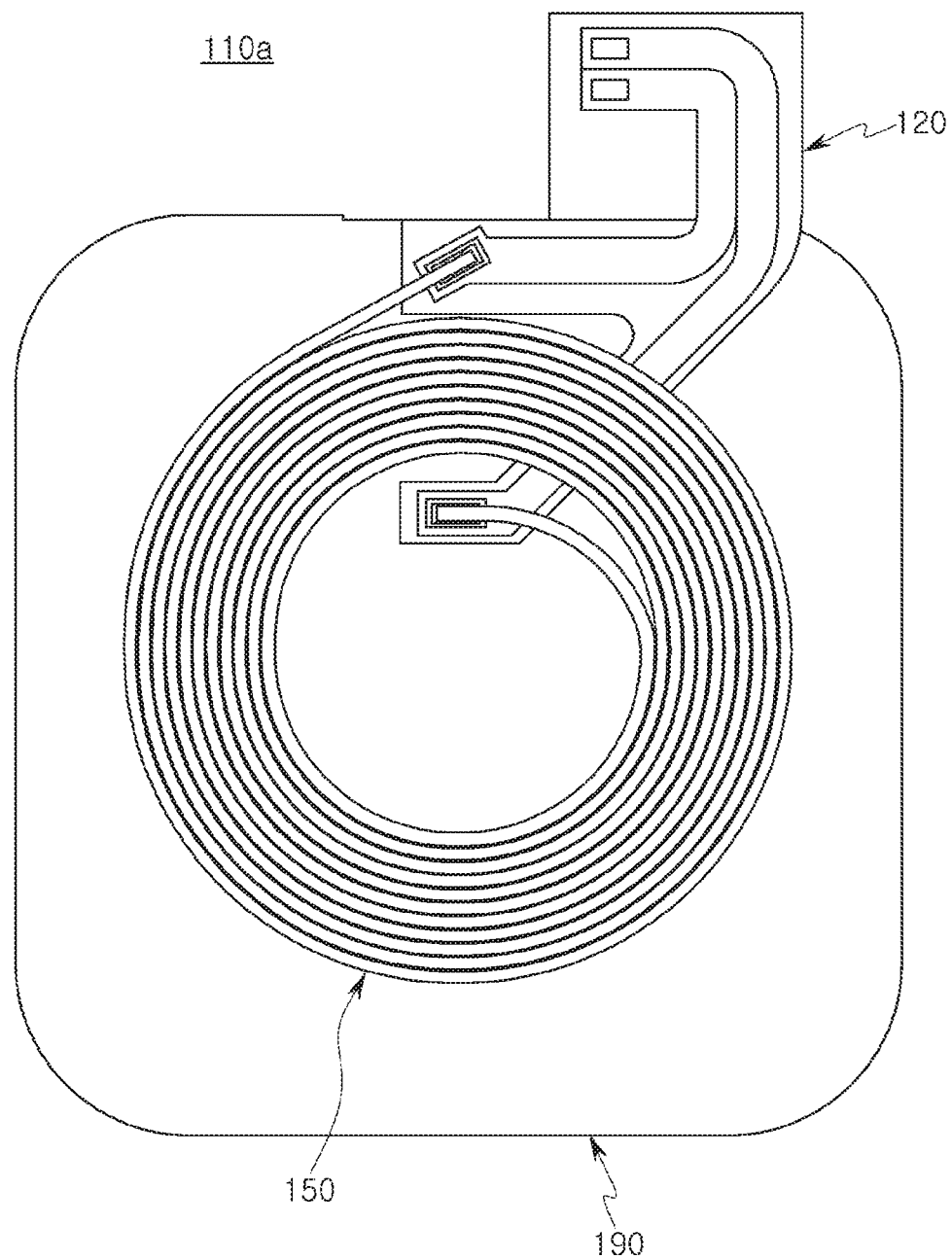
FIG. 12 is a schematic plan view illustrating a coil assembly, according to an example.
Figure 13:
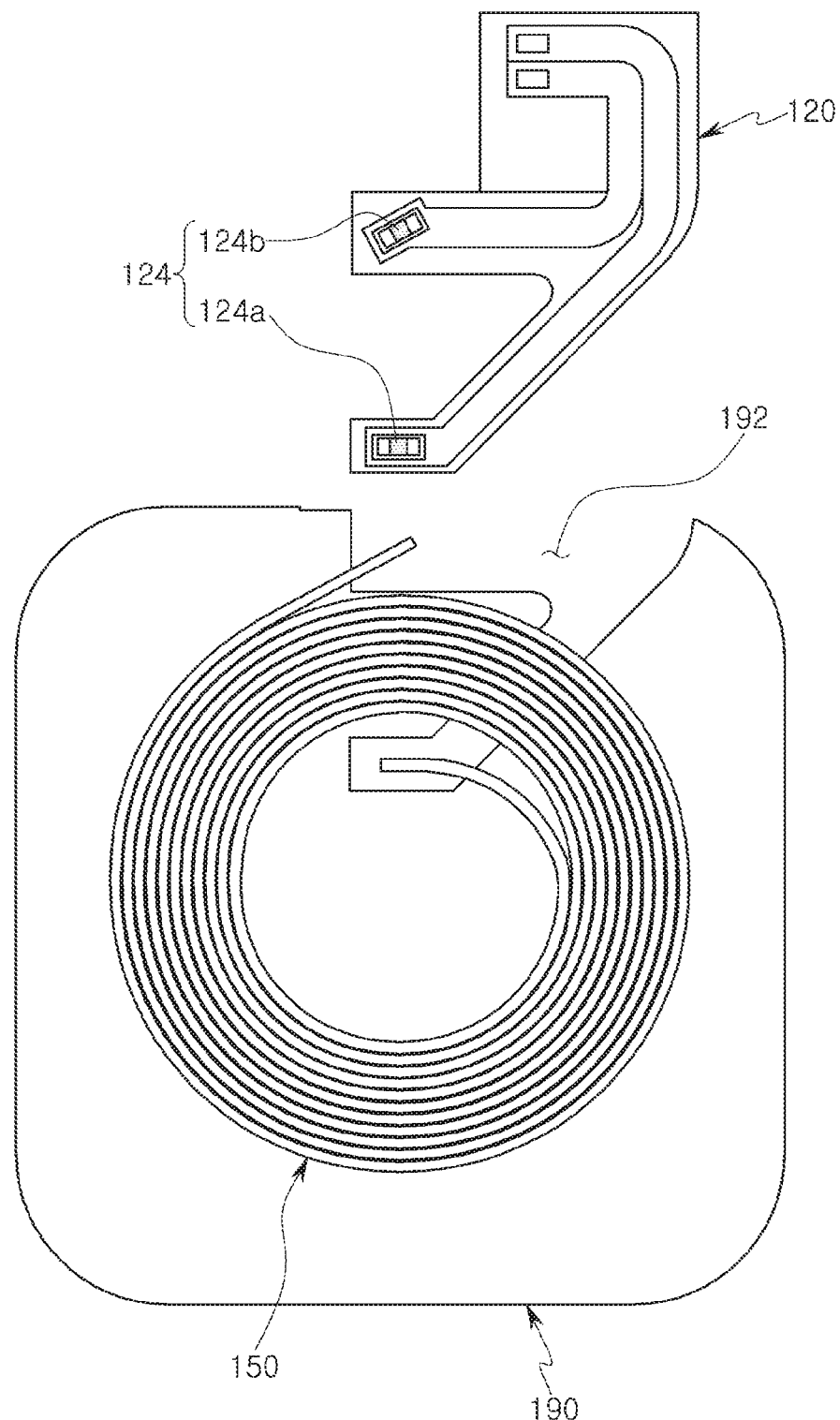
FIG. 13 is an exploded view of FIG. 12.

FIG. 12 is a schematic plan view illustrating a coil assembly 110a, according to an example. FIG. 13 is an exploded view of FIG. 12.

Referring to FIGS. 12 to 13, the coil assembly 110a includes a coil portion 150 and a connection substrate 120, in a manner similar the example described above. Moreover, a supporting substrate 190 to which the coil portion 150 is attached is further included in the coil assembly 110a.

In an example, the coil portion 150 is supplied while being attached to the supporting substrate 190, and is connected to the connection substrate 120.

Thus, a bonding member (not shown) bonding the coil portion 150 to the supporting substrate 190 may be interposed between the coil portion 150 and the supporting substrate 190. However, various other configurations may be possible. For example, one surface of the supporting substrate 190 may be formed as a bonding material, or the coil portion 150 and the supporting substrate 190 may be bonded through the adhesive layer (e.g., the adhesive layer 153 of FIG. 6) of the coil portion 150.

The supporting substrate 190 may be any one of various members as long as a member with electrical insulation properties is able to be easily combined with the coil portion 150, such as an insulating film or an insulating tape.

Additionally, the supporting substrate 190 may be provided in the form the same as or similar to the protective member 180 described above.

The supporting substrate 190 includes a substrate combining portion 192. The substrate combining portion 192 is a space in which the connection substrate 120 is accommodated, and defines a position at which the connection substrate 120 is coupled to the supporting substrate 190. Thus, the substrate combining portion 192 is an empty space, or cut-out space, having a form the same as a form of at least a portion of the connection substrate 120.

In an example, a portion of the connection substrate 120 is combined with the substrate combined portion 192, and a remaining portion of the connection substrate 120 is located outside the supporting substrate 190. However, if necessary, the entirety of the connection substrate 120 may be combined with (e.g., accommodated in) the substrate combined portion 192.

Due to the configuration described above, the coil assembly 110a enables the coil portion 150 and the connection substrate 120 to be easily coupled to each other in a manufacturing process.

In an example in which the supporting substrate 190 is not provided, the coil portion 150 and the connection substrate 120 are fixed to a regular position, first. Here, the regular position is a position in which the end portions of the coil portion 150 are disposed on the first coil pad 124a and the second coil pad 124b of the connection substrate 120, respectively.

During the process described above, it is difficult to handle the coil portion 150, so it may be difficult to align the coil portion 150 and the connection substrate 120.

Thus, in an example in which the supporting substrate 190 is provided, first, the coil portion 150 is attached to the supporting substrate 190, and is then coupled to the connection substrate 120. Thus, the coil portion 150 is able to be handled while the coil portion 150 is attached to one surface of the supporting substrate 190, and the risk that the coil portion 150 may be modified or damaged in a handling process may be significantly reduced.

When the coil portion 150 is attached to the supporting substrate 190, both end portions of the coil portion 150 are disposed on the substrate combining portion 192 of the coil portion 150. Thus, when the connection substrate 120 is inserted into the substrate combining portion 192 of the supporting substrate 190, the end portions of the coil portion 150 may be located on the coil pad 124 of the connection substrate 120.

In the coil assembly 110a, alignment of the connection substrate 120 and the coil portion 150 is completed through only a process in which the connection substrate 120 is inserted into the substrate combining portion 192 of the supporting substrate 190.

Thus, the coil assembly 110a is able to be manufactured through only a process in which the connection substrate 120 is inserted into the substrate combination portion 192 of the supporting substrate 190, and a process in which respective end portions of the coil portion 150 and the coil pads 124a and 124b are bonded to each other using a process such as thermal fusion.

As described above, in a process for manufacturing the coil assembly 110a, the coil portion 150 and the connection substrate 120 are substantially aligned, so that the manufacturing time is significantly reduced.

Figure 14:
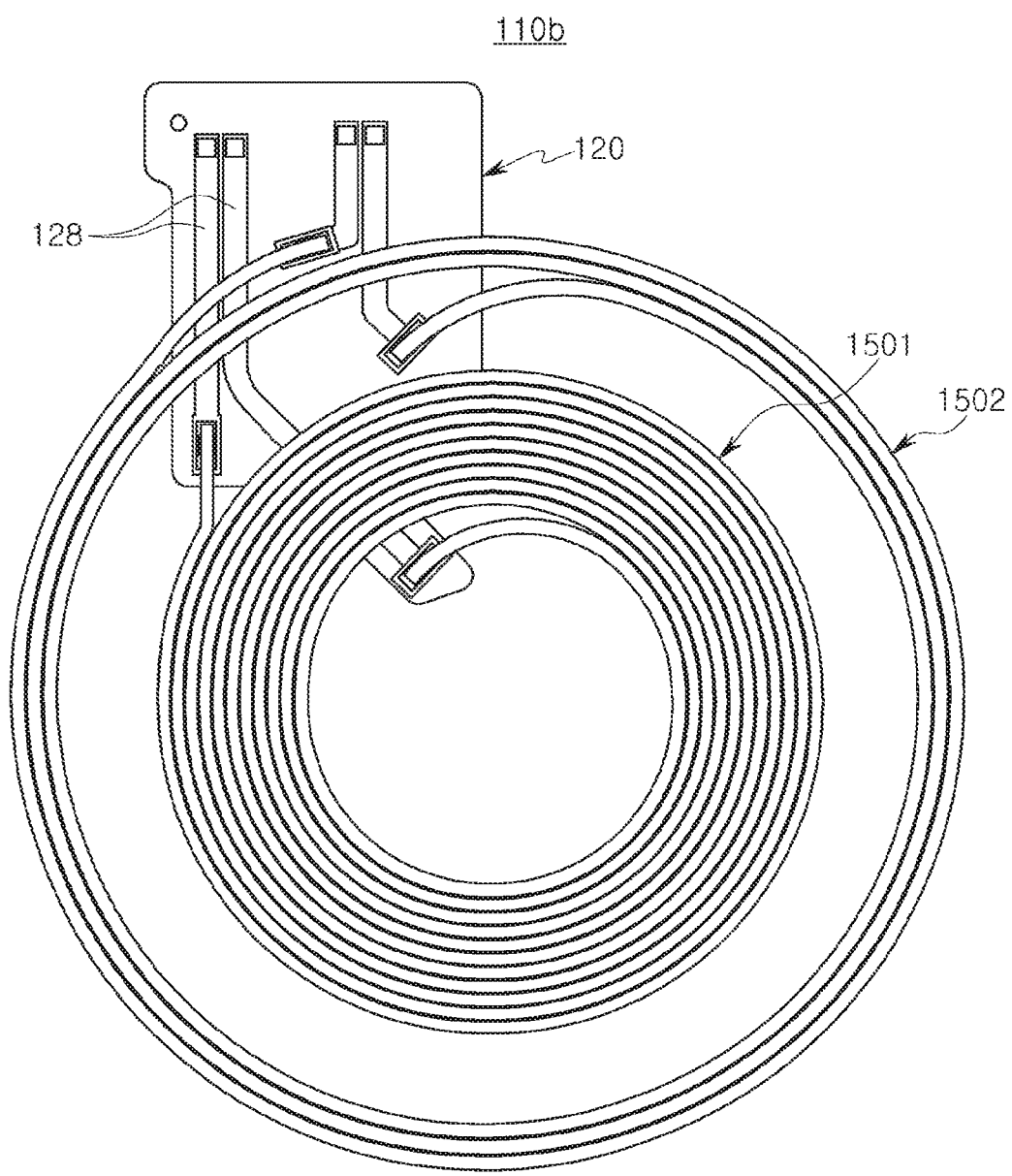
FIG. 14 is a schematic drawing illustrating a coil assembly, according to an example.

FIG. 14 is a schematic drawing illustrating a coil assembly 110b, according to an example.

Referring to FIG. 14, the coil assembly 110b includes a first coil portion 1501 and a second coil portion 1502. Each of the first coil portion 1501 and the second coil portion 1502 may be configured in a manner the same as that of the coil portion (150 of FIG. 3) described above.

In an example, the first coil portion 1501 is disposed in an internal space of the second coil portion 1502. Thus, the second coil portion 1502 may further include an insertion groove (not shown) into which the connection wiring 128 connected to the first coil portion 1501 is inserted.

However, the coil assembly 110b is not limited to the aforementioned configuration, and the first coil portion 1501 may be disposed in an external space of the second coil portion 1502.

Each of the first coil portion 1501 and the second coil portion 1502 may perform at least one of transmission and reception of electric power for wireless charging, a radio frequency identification (RFID) function, a near field communication (NFC) function, and magnetic secure transmission (MST) function. For example, the first coil portion 1501 may be used for transmission and reception of electric power for wireless charging, while the second coil portion 1502 may be used for one among RFID, NFC, and MST.

Additionally, various modifications may be possible. For example, the first coil portion 1501 may be used for NFC, and the second coil portion 1502 may be used for MST.

Additionally, as necessary, a third coil portion and a fourth coil portion may be additionally disposed in the coil assembly 110b in the same manner as the first coil portion 1501 and the second coil portion 1502.

As set forth above, according to examples, in a coil assembly, an end portion of a coil portion is disposed in an accommodating portion of a connection substrate, so that a thickness of a coil assembly may be prevented from being increased by lifting a portion of the coil portion. Moreover, a connection wiring of a connection substrate is inserted into an insertion groove formed in a coil portion. Thus, a thickness of the coil assembly is significantly reduced, so that the coil assembly may be easily mounted on a mobile terminal having a thin form factor.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil assembly, comprising:
   a connection substrate comprising a coil pad and an accommodating portion, the accommodating portion being adjacent to the coil pad and including a space; and
   a coil portion comprising a spiral wiring and end portions bonded to the coil pad, at least a portion of the coil portion being in the accommodating portion,
   wherein the coil pad comprises a first coil pad inside the coil portion and a second coil pad outside the coil portion,
   wherein one of the end portions disposed at a central side of the coil portion is connected to the first coil pad, and another one of the end portions disposed at an outer side of the coil portion is connected to the second coil pad,
   wherein each of the end portions comprises a first section bonded to the coil pad and a second section extending from each of both sides of the first section and being at least partially in the space, and
   wherein the end portions are sections disposed to oppose the coil pad and the accommodating portion.

2. The coil assembly of claim 1, wherein the first section has a thickness that is less than a thickness of the second section.

3. The coil assembly of claim 1, wherein the accommodating portion is on opposing sides of the coil pad.

4. The coil assembly of claim 1, wherein the accommodating portion includes through-hole passing through the connection substrate.

5. The coil assembly of claim 1, wherein the connection substrate further comprises:
   a connection pad; and
   a connection wiring connecting the connection pad to the coil pad.

6. The coil assembly of claim 5, wherein
   the coil portion further comprises an insertion groove being opposite to the connection wiring, and
   at least a portion of the connection wiring is in the insertion groove.

7. The coil assembly of claim 1, wherein
   the coil portion further comprises coil strands, the coil strands being in parallel and spirally wound, and
   the coil strands are electrically connected to each other.

8. The coil assembly of claim 7, wherein
   each of the coil strands comprises a conductor line, an insulating coating surrounding the conductor line, and an adhesive layer outside the insulating coating, and
   the coil strands are integrated by the adhesive layer.

9. The coil assembly of claim 7, wherein the coil portion further comprises a stepped portion along a pressure line, which is in a radial direction of the coil portion.

10. The coil assembly of claim 7, wherein the coil strands are on a same plane.

11. The coil assembly of claim 1, further comprising:
    a supporting substrate to which the coil portion is attached,
    wherein the supporting substrate comprises a substrate combining portion to which the connection substrate is bonded.

12. The coil assembly of claim 11, wherein the end portions are on the substrate combining portion.

13. The coil assembly of claim 1, wherein the coil portion is configured to perform any one of transmission and reception of electric power for wireless charging, a radio frequency identification (RFID) function, a near field communication (NFC) function, and a magnetic security transmission (MST) function.

14. A coil assembly, comprising:
    a connection substrate comprising a coil pad and an accommodating portion, the accommodating portion being adjacent to the coil pad and including a space; and
    a coil portion comprising coil strands, end portion, and at least one stepped portion, the coil strands being in parallel and being in a spiral shape in a single layer, the end portions bonded to the coil pad, and the at least one stepped portion along a pressure line, which is in a radial direction of the coil portion,
    wherein at least a portion of the coil portion is in the accommodating portion, wherein the coil pad comprises a first coil pad inside the coil portion and a second coil pad outside the coil portion,
    wherein one of the end portions disposed at a central side of the coil portion is connected to the first coil pad, and another one of the end portions disposed at an outer side of the coil portion is connected to the second coil pad,
    wherein each of the end portions comprises a first section bonded to the coil pad and a second section extending from each of both sides of the first section and being at least partially in the space, and
    wherein the end portions are sections disposed to oppose the coil pad and the accommodating portion.

15. A coil assembly, comprising:
    a connection substrate comprising a coil pad, a connection wiring extended from the coil pad and an accommodating portion being adjacent to the coil pad and including a space; and
    a coil portion comprising coil strands disposed in parallel to form a spiral shape, end portions bonded to the coil pad, and an insertion groove disposed in a position opposing the connection wiring,
    wherein at least a portion of the connection wiring is disposed in the insertion groove,
    wherein at least a portion of the coil portion is disposed in the accommodating portion,
    wherein the coil pad comprises a first coil pad inside the coil portion and a second coil pad outside the coil portion, wherein one of the end portions disposed at a central side of the coil portion is connected to the first coil pad, and another one of the end portions disposed at an outer side of the coil portion is connected to the second coil pad, wherein each of the end portions comprises a first section bonded to the coil pad and a second section extending from each of both sides of the first section and being at least partially in the space, and wherein the end portions are sections disposed to oppose the coil pad and the accommodating portion.

16. The coil assembly of claim 15, wherein the insertion groove is in the coil strands and extends in a radial direction of the coil portion.

17. The coil assembly of claim 15, wherein a thickness of the insertion groove is substantially equal to a thickness of the connection wiring.

18. A coil assembly, comprising:

a flat spiral-shaped coil member composed of coil strands, the flat spiral-shaped coil member including an insertion groove defined thereon and extending across the flat spiral-shaped coil member, the flat spiral-shaped coil member including an end portion bonded to a coil pad; and a connection substrate comprising, a connection pad configured to be connected to an external component, the coil pad including, a first coil pad being inside the flat spiral-shaped coil member, being at a central side of the flat spiral-shaped coil member, and connected to a first end portion of the flat spiral-shaped coil member, and a second coil pad being outside the flat spiral-shaped coil member, being at an outer side of the flat spiral-shaped coil member, and connected to a second end portion of the flat spiral-shaped coil member, a first connection wiring connecting the first coil pad to the connection pad, and being in the insertion groove, a second connection wiring connecting the second coil pad to the connection pad, and an accommodating portion being adjacent to a corresponding one of the first coil pad and the second coil pad, and including a space, wherein each of the first end portion and the second end portion includes a first section bonded to the corresponding one of the first coil pad and the second coil pad and a second section extending from each of both sides of the first section and being at least partially in the space, and wherein the first and second end portions are sections disposed to oppose the first coil pad, the second coil pad, and the accommodating portion.

19. The coil assembly of claim 18, wherein a thickness of the insertion groove is substantially equal to a thickness of the first connection wiring.

20. The coil assembly of claim 18, wherein the insertion groove is defined by a portion of the coil strands having a reduced thickness.

21. The coil assembly of claim 18, wherein a thickness of the at the flat spiral-shaped coil member in a region of the insertion groove is less than a thickness of the flat spiral-shaped coil member in a region adjacent to the insertion groove.

* * * * *